United States Patent Office 3,432,642
Patented Mar. 11, 1969

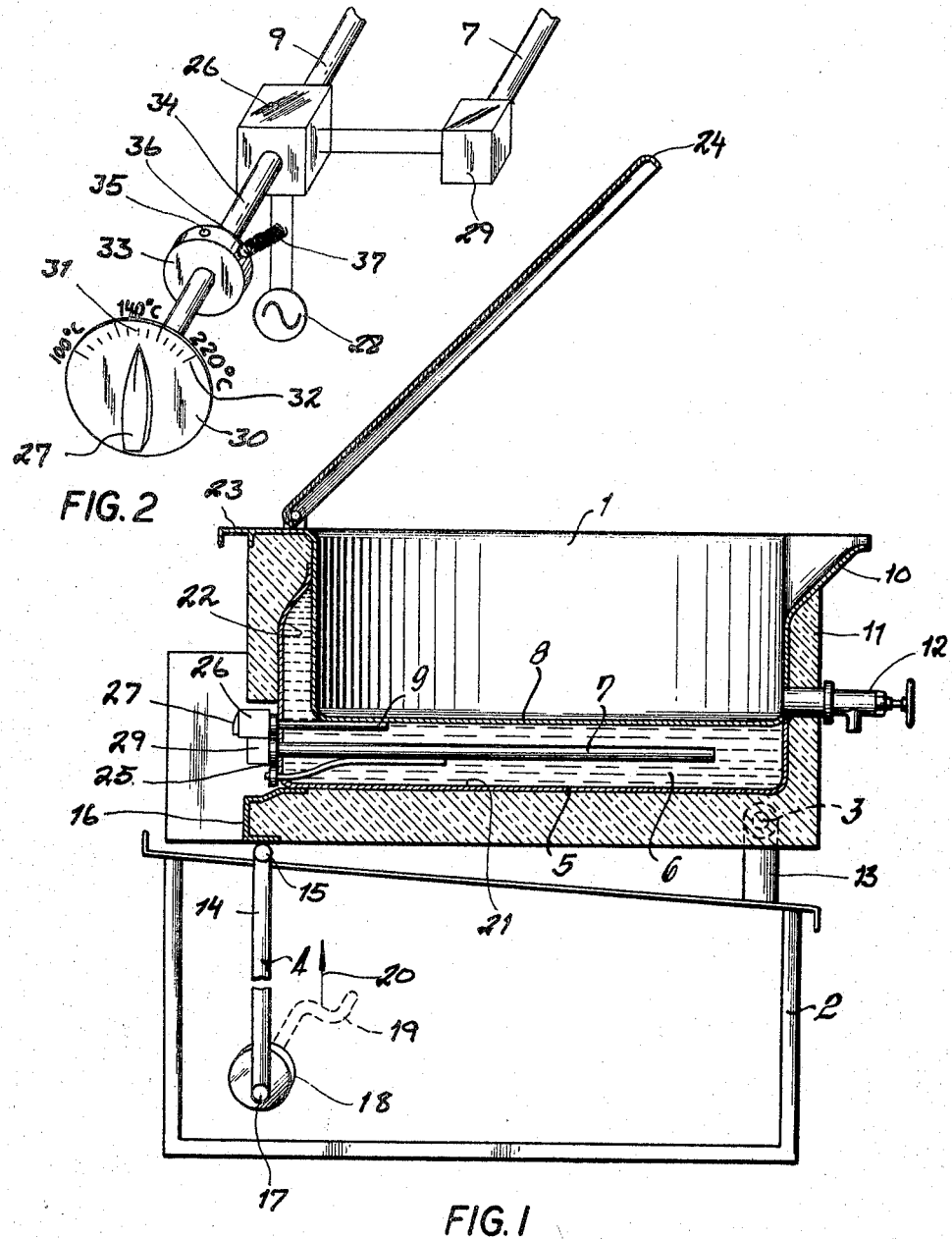

3,432,642
COOKING PAN SUITABLE FOR THE PREPA-
RATION OF DIETETIC AND NONDIETETIC
FOODS
Alfred Löhr and Helmut Hemmann, Herborn, and Karl
Tropp, Werdorf, Germany, assignors to Burger Eisen-
werke Aktiengesellschaft, Wetzlar, Germany, a corpo-
ration of Germany
Filed May 23, 1967, Ser. No. 640,531
Claims priority, application Germany, June 1, 1966,
B 87,379
U.S. Cl. 219—439          5 Claims
Int. Cl. F27d 11/02

ABSTRACT OF THE DISCLOSURE

A cooking vessel for the frying, pan-broiling, and pan-roasting of food products (primarily meat) and settable without structural modification for the cooking of dietary portions requiring a minimum of browning, searing and fat-frying of comestibles, in which the vessel is provided with a double-wall bottom containing a liquid heat-distributing and heat-equalizing medium of good thermal conductivity and a high boiling point (e.g. silicone, mineral or vegetable oil having a boiling point and thermal-degradation temperature above about, say 225° C.), an electric heating element in the chamber between the walls, and a thermostat immersed in the heat-transfer medium proximal to the bottom of the inner vessel. Means is provided for selectively setting and/or indexing the thermostat at temperature levels.

Our present invention relates to cooking vessels, especially for the gross or large-scale or institutional cooking of dietetic food and the normal roasting or pan-broiling of comestibles in which the cooking pan is heated from below to elevated temperatures sufficient to effect pan-broiling, frying or roasting (i.e. about 220° C.).

Devices for the large-scale pan-broiling, roasting or frying of comestibles have been proposed in which a liquid-retentive vessel, which may or may not contain cooking fat, is tiltably mounted upon a support to permit the contents of the vessel to be discharged and is heated from below by electric heaters, gas burners or the like. In such systems, the cooking fat or comestible within the vessel is brought to a temperature above the boiling point of water and a pan-broiling, roasting deep-frying or shallow frying of the food products can be carried out when the food is fully immersed in cooking fat within the pan or is cooked with lesser quantities of the cooking fat or even in its own juices. Of late, it has become desirable to cook in similar pans dietetic food portions which are not to be browned, overheated or encrusted during the frying, broiling or roasting process and preferably are to be cooked solely in the presence of the juices of the meat without any charring, searing or browning. Conventional large-size gross cooking pans for institutional cooking and the like have hitherto been incapable of use both for conventional frying, broiling or roasting and for the preparation of dietetic portions of meat in the manner described because of nonuniform heating of the pieces of food within the pan and the almost inevitable searing and browning associated with the heating arrangement used therewith.

It is, therefore, the principal object of the present invention to provide an improved cooking pan of the character described, adapted to be employed selectively for the normal frying of foods and for the preparation of dietetic portions requiring uniform heating and searing-free cooking thereof.

Another object of this invention is to provide a relatively inexpensive broiling, roasting or frying pan for institutional kitchens and the like which is of simplified construction, affords uniform heating of the food product and is relatively inexpensive.

Yet another object of our invention is to provide a frying, roasting or cooking pan in which dietary foods can be cooked uniformly, without browning in an economical manner.

These objects and others which will become apparent hereinafter are attained, in accordance with the present invention, by providing a cooking vessel for the deep-fat frying, shallow frying, baking or roasting of food products which comprises an upwardly open relatively shallow vessel (i.e. a vessel whose diameter exceeds its axial height) having a double-wall bottom defining a chamber in heat-exchanging relationship with the vessel, this chamber being filled with a heat-resistant refractory oil or other liquid having a boiling point substantially above about 225–250° C. and advantageously a silicone, mineral or vegetable oil with a boiling point above this level which has high thermal conductivity and can serve as a heat-distributing or temperature-equalizing medium. A resistance heater is immersed in the chamber and advantageously extends diametrically therealong substantially equidistant between the walls of the chamber while a thermostat is immersed in the oil within this chamber for controlling the electric heating element. Means is provided on the thermostat for indexing the heating and controlling element in a low-temperature position below 150° C., which corresponds to the browning temperature of meats, and a high-temperature position at substantially 220° C., i.e. the temperature at which normal roasting and browning can be carried out. In the low-temperature condition, dietetic meats can be cooked thrugh at temperatures between 100° C. and 140° C. without browning and without the addition of fat to the inner vessel. For normal frying operations, cooking fat can be supplied to the vessel, while high-temperature roasting or baking can be carried out in the juices released by the meat at the elevated temperature without additional fats.

The above and other objects, features and advantages of the present invention will become more readily apparent from the following description, reference being made to the accompanying drawing in which:

FIG. 1 is an axial cross-sectional view through an apparatus embodying the present invention, partly shown in diagrammatic form; and FIG. 2 is a diagrammatic view of the control arrangement of this system.

In FIG. 1 of the drawing, we show an institutional cooking apparatus wherein the cooking vessel 1 is provided with a pouring spout 10 and is mounted in a heat-insulating housing 11 through which projects a spigot 12 in communication with the interior of the vessel 1 at its floor 8. When the spigot 12 is opened, fats, juices and cooking liquids within the vessel 1 can be discharged. The housing 11 receiving the vessel 1 is pivoted at 3 on a pair of trunnions 13 (only one shown in FIG. 1), carried by a support frame 2 adapted to stand upon the floor. At the rearward end of the housing body 11, a lifting device 4 is provided. This lifting device comprises a pair of spaced-apart rods 14 (only one shown) connected by a traverse 15 at their upper end and bearing upon a bracket 16 connected with the metallic wall 5 of a chamber containing a heat-transfer liquid 6 and forming part of the housing body 11. The bars 14 are pivoted eccentrically at 17 to a crank or disk 18 which can be rotated externally of the frame 2 by a handle 19 to raise and lower the bars 14 (arrow 20) and thereby tilt the housing body 11 and the vessel 1 about the pivot 3. This pivoting action enables the dumping of any contents of the vessel 1 for emptying and cleaning.

As indicated earlier, the bottom of the vessel 1 is formed with a pair of spaced-apart walls 5 and 8 which define between them a chamber 21 for the heat-transfer liquid 6, this chamber extending at least about part of the periphery of the vessel 1 upwardly therealong as represented at 22 to ensure effective heat transfer between the liquid medium 6 and the contents of the vessel 1. At its upper end, the metal (e.g. stainless steel or Monel) vessel 1 is provided with a flange 23 to which a cover 24 is hinged. This cover prevents splattering of hot juices when the roasting or frying process is carried out in the vessel 1. The heat-resistant liquid 6 of high thermal conductivity, high boiling point and high thermal-degradation temperature can be any of the mineral oils, silicone oil and even vegetable oils having a thermal-degradation temperature and boiling point above about 225° C.–250° C. when the normal roasting, frying or broiling temperature is about 220° C., as described hereinafter. In fact, the most suitable oils are those having the aforementioned characteristics and commonly used as oil baths for controlling chemical-reaction vessels.

An electric-resistance heating element 7 is anchored at 25 in the rear wall of the chamber 21 and extends into the oil bath 6 substantially midway between the walls 5 and 8 and dimetrically with respect to the cylindrical vessel over at least the major portion of the diameter thereof, as indicated in FIG. 1. In addition, a thermostat element 9 projects from wall 25 into the oil bath 6 and is provided at 26 with a control member 27 whose function and operation is discussed below in connection with FIG. 2. Advantageously, the thermostat element 9 lies against the underside of the floor 8 of the vessel 1 upon which the portions of the comestible are disposed. The thermostat electrical circuitry, in the housing 26, is energized by a source 28 of electric current (FIG. 2) and connected to the terminals of the thermostat 7 in the housing 29 (FIGS. 1 and 2) in the conventional manner. The thermostat assembly 9, 26, 27 is provided with a temperature-setting and indicating scale 30 adapted to be swept by the selector knob 27 and bearing an indicating range running from, say, 100° C. to 220° C. with index marks 31 and 32, respectively, at about 140° C. and 220° C. At the higher temperature, the pan can be used in the usual manner for roasting, broiling, deep-frying, shallow frying and pan-broiling meat in added fat or in its own juices, with or without the addition of basting liquid. The excess liquid can be drawn off at the spigot 12. During these processes, substantial browning and searing may occur without detrimental effects and in a highly uniform manner as a consequence of the uniform distribution of heat over the floor 8 of the vessel 1 and the corresponding high rate of heat transfer by the liquid 6. Pieces of meat such as cutlets, steak and chopmeat (patties) may be thoroughly cooked to any degree, i.e. from rare to well-done, merely by adjusting the dial 27. Furthermore, at temperatures below the browning temperature of about 150° C., i.e. at temperatures ranging from 100° C. to 150° C., the meat can be steamed or cooked in its own juices without browning or searing, with or without the addition of cooking fluid to the vessel 1. By limiting the cooking temperature to a maximum of approximately 220° C., it is possible to carry out even the most rigorous cooking process without the development of smoke from degradation of the juices or added fats.

According to another aspect of this invention, we provide indexing means, here represented as a ball detent, for retaining the knob 27 at a temperature of about 140° C. for the preparation of dietetic foods without searing or browning (a temperature of 120° C. to 150° C. being suitable for this purpose) and for retaining the knob 27 at the 220° C. mark for normal broiling and roasting. The detent may be formed by a disk 33 mounted on the control shaft 34 of the thermostat 9 which is provided with cavities 35 associated with the temperatures of 140° C. and 220° C. and adapted to receive a detent ball 36 which is biased thereagainst by a spring 37 in the housing 26. In FIG. 2, this detent is shown withdrawn from the housing for convenience.

It will be noted that spout 10 and drain 12 are disposed along a common generatrix of the cylindrical pan 1 and that the double wall of this pan, defining the chamber 22 as an extension of heating space 21, extends about part of the pan periphery but terminates short of the region of that common generatrix; this, together with the fact that heater element 7 ends at a distance from that generatrix after traversing the double bottom from a diametrically opposite point, avoids excessive heat losses through the spout 10 which remains upwardly open even upon a lowering of cover 24.

The invention described and illustrated is believed to admit of many modifications within the ability of persons skilled in the art, all such modifications being considered within the spirit and scope of our invention except as otherwise limited by the appended claims.

We claim:
1. A cooking vessel comprising a substantially cylindrical pan with a double bottom forming a heating space, with a spout at its top and with a spigot-controlled drain lying along a common generatrix with said spout just above said double bottom, said pan having a double wall integral with said double bottom and forming an extension of said heating space above said double bottom in a region which includes part of the periphery of said pan but terminates short of the region of said generatrix; heating means including a high-boiling thermally conductive liquid in said heating space and said extension thereof; support means connected with said pan at a horizontal pivotal axis immediately proximal to said generatrix; and a mechanism on said support means engaging said pan at a location remote from said generatrix for tilting said pan about said axis.

2. A vessel as defined in claim 1 wherein said heating means further includes an elongate electric heating element extending substantially horizontally below said extension into said heating space from a point above said remote location and terminating short of said generatrix.

3. A vessel as defined in claim 2, further comprising thermostat means for controlling said heating means, said thermostat means including a rod extending above said heating element into contact with the upper boundary of said heating space.

4. A vessel as defined in claim 1, further comprising a substantially cup-shaped heat-insulating housing surrounding said pan and traversed by said drain, said mechanism bearing upon said pan through the bottom of said housing, said support means including a pivot at the bottom of said housing defining said pivotal axis.

5. A vessel as defined in claim 1, further comprising a cover for said pan leaving said spout open to the atmosphere in a position of closure.

References Cited

UNITED STATES PATENTS 2,708,436    5/1955    Foster.
2,969,452    1/1961    Geller et al. _____ 219—326 X

FOREIGN PATENTS 1,306,374    11/1961    France.
1,375,449    9/1964    France.
304,595    3/1955    Switzerland.

ANTHONY BARTIS, *Primary Examiner.*

U.S. Cl. X.R.

126—378; 165—104; 219—326